(12) United States Patent
Kobayashi et al.

(10) Patent No.: US 6,930,717 B1
(45) Date of Patent: Aug. 16, 2005

(54) PRINTER-INCORPORATED ELECTRONIC STILL CAMERA

(75) Inventors: Shigeto Kobayashi, Saitama (JP); Keiji Tsubota, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 763 days.

(21) Appl. No.: 09/705,721

(22) Filed: Nov. 6, 2000

(30) Foreign Application Priority Data

Nov. 4, 1999 (JP) .................................. 11-313310

(51) Int. Cl.⁷ .......................................... H04N 5/222
(52) U.S. Cl. ..................... 348/333.02; 348/333.07; 348/207.2; 348/208.2
(58) Field of Search ............... 348/207.99, 207.2, 348/208.99, 208.2, 333.01, 333.02, 333.07

(56) References Cited

U.S. PATENT DOCUMENTS

| | | | | |
|---|---|---|---|---|
| 4,600,319 A | * | 7/1986 | Everett, Jr. .................. 400/54 |
| 4,937,676 A | * | 6/1990 | Finelli et al. ................ 348/375 |
| 5,499,068 A | * | 3/1996 | Satoh et al. ............. 348/207.99 |
| 5,790,193 A | * | 8/1998 | Ohmori ...................... 348/375 |
| 5,909,248 A | * | 6/1999 | Stephenson ................ 348/373 |
| 5,917,548 A | * | 6/1999 | McIntyre ............... 348/333.06 |
| 5,920,342 A | * | 7/1999 | Umeda et al. ......... 348/211.14 |
| 6,094,282 A | * | 7/2000 | Hoda et al. .................. 358/401 |
| 6,229,565 B1 | * | 5/2001 | Bobry .................... 348/207.99 |
| 6,441,854 B2 | * | 8/2002 | Fellegara et al. ...... 348/333.13 |
| 6,611,291 B1 | * | 8/2003 | Dow et al. ............. 348/333.01 |
| 6,628,333 B1 | * | 9/2003 | Gowda et al. ......... 348/333.11 |

FOREIGN PATENT DOCUMENTS

JP 4-194832 7/1992 .......... G03B 17/52

OTHER PUBLICATIONS

Abstract of WO99/21055 Apr. 29, 1999.

* cited by examiner

*Primary Examiner*—Tuan Ho
*Assistant Examiner*—Gevell Selby
(74) *Attorney, Agent, or Firm*—Sughrue Mion, PLLC

(57) ABSTRACT

There is disclosed a printer-incorporated electronic still camera that may be switched over between a photography mode, a reproduction mode, a print mode and a setup mode by operating a mode selection dial. If it is judged by an output signal from an acceleration sensor that the still camera is in a stable position when the setup mode is selected, a display device of the still camera initially displays a print menu that includes a list of setup items relating to the print mode. On the contrary, if the still camera is judged to be in an unstable position when the setup mode is selected, a camera menu including a list of setup items for the photography mode is initially displayed on the display device.

3 Claims, 9 Drawing Sheets

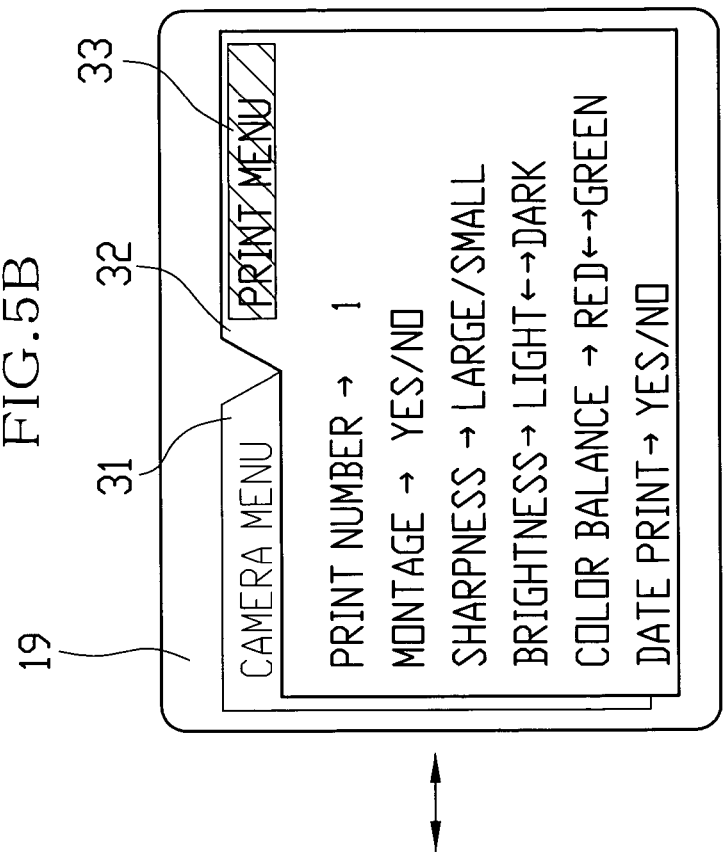
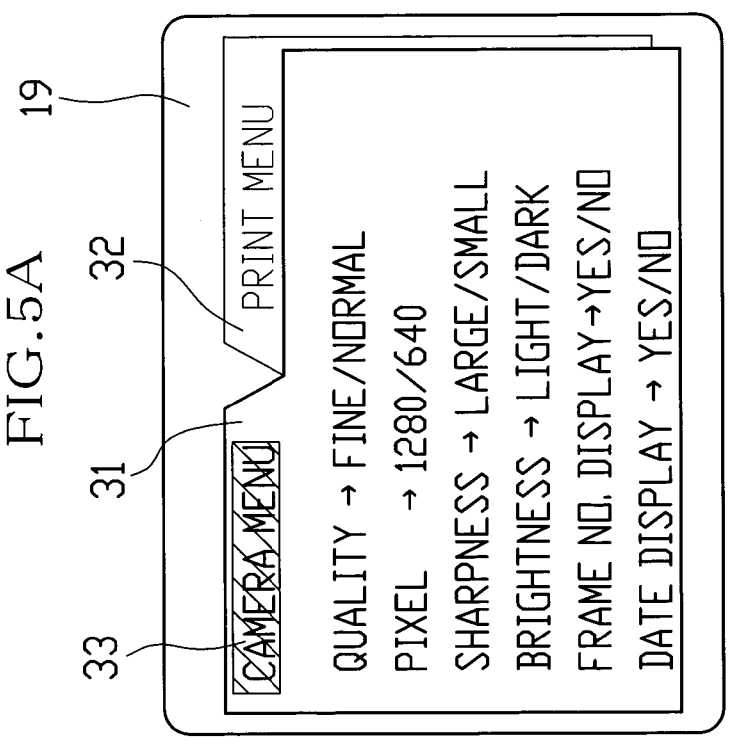

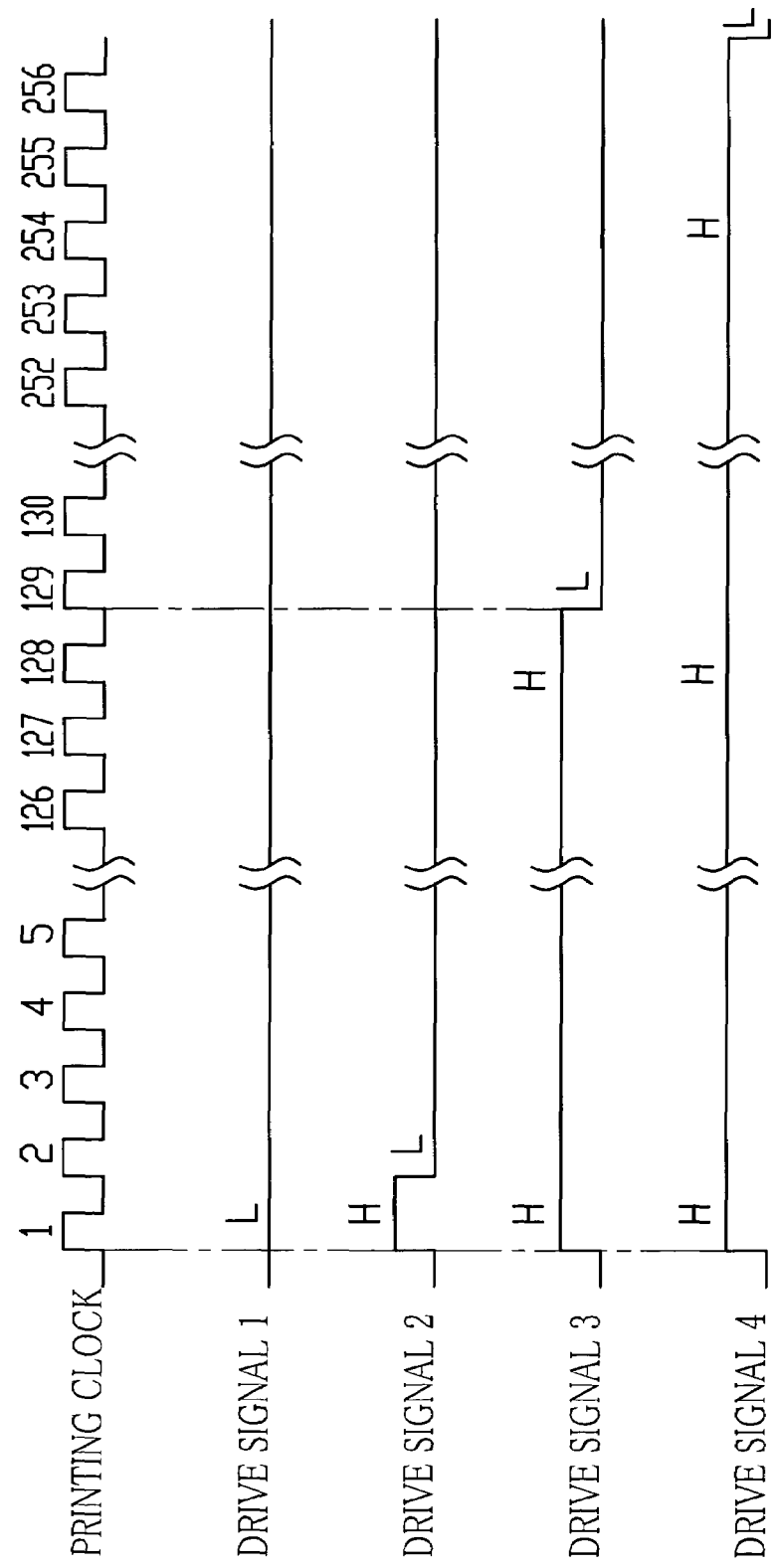

PRINTER-INCORPORATED ELECTRONIC STILL CAMERA

BACKGROUND OF THE INVENTION

1. Field of the Invention

The present invention relates to a printer-incorporated electronic still camera that may be switched over between a photography mode, a reproduction mode, a print mode and a setup mode by operating a mode selection device. More particularly, the printer-incorporated electronic still camera of the present invention is provided a with a display device that functions as an electronic viewfinder in the photography mode, displays a photographed still image in the reproduction mode and the print mode, and displays setup items in the setup mode.

2. Background Arts

Portable electronic still cameras are widely known, that obtain electronic images from optical images of subjects through an imaging device, such as a CCD image sensor, and stores the electronic images in a memory in the form of digital image data. Also an electronic still camera having a printer incorporated therein has been known. An example of this type of electronic still camera is disclosed in JPA 11-127409, wherein a self-developing type photo film sheet, called an instant film, is used as a recording medium for printing an image thereon, so an optical printer is driven based on the image data read out from the memory, to photograph or optically record an image on the instant film.

The printer-incorporated electronic still camera has an LCD panel that displays an image reproduced based image data read out from the memory in a reproduction mode, so that the user may select an appropriate image to print while observing the LCD panel. The LCD panel functions as an electronic viewfinder that displays moving images of photographic subjects in a real time fashion in a photography mode. In a setup mode for setting up various items, e.g. the number of prints to make from a picture frame, the LCD panel is also used for displaying setup menus.

However, because the printer-incorporated electronic still camera is desired to be as compact as the camera without printer, but doubles as a still camera and a printer, there are so large number of setup items including those relating to the photography and to the printing, that it is difficult to display all the items in the same screen on the small LCD panel.

SUMMARY OF THE INVENTION

In view of the foregoing, an object of the present invention is to provide a printer-incorporated electronic still camera that is easy to operate in any mode, especially in the setup mode.

According to the present invention, a printer-incorporated electronic still camera comprises an imaging device, a memory, a printing device, a display device, and a mode selection device for switching over the still camera between a photography mode for converting optical images into electronic image signals through the imaging device and storing the image signals in the memory, a reproduction mode for displaying still images on the display device based on the image signals read out from the memory, a print mode for printing the displayed still image on a recording medium, and a setup mode for setting up many kinds of setup items of the still camera, wherein the setup items are sorted into a plurality of groups, and the display device displays the setup items of one group at a time in the setup mode.

Because a large number of setup items are sorted into a plurality of groups, and are displayed group by group, operation efficiency in the setup mode is remarkably improved. Furthermore, each item is displayed in a sufficiently large size even where the display screen is small. According to a preferred embodiment, the printer-incorporated electronic still camera further comprises an acceleration sensor and a device for judging by signals from the acceleration sensor whether the still camera is in a stable position or in an unstable position. If the still camera is judged to be in the unstable position when the setup mode is selected, the display device initially displays a group of setup items that relate to the photography mode. If the still camera is judged to be in the stable position when the setup mode is selected, a group of setup items that relate to the print mode is initially displayed.

According to another preferred embodiment, the printer-incorporated electronic still camera further comprises a lens shielding device for shielding a lens of the imaging device from external light, and a detection device for detecting whether or not the lens is shielded by the lens shielding device, and a control device for controlling the display device to display a group of setup items that relate to the photography mode initially if the lens is not shielded when the setup mode is selected, or a group of setup items that relate to the print mode initially if the lens is shielded when the setup mode is selected.

According to still another embodiment, the printer-incorporated electronic still camera further comprises a detection device for detecting whether or not the recording medium is loaded in the still camera, and a control device for controlling the display device to display a group of setup items that relate to the photography mode initially if the still camera is not loaded with the recording medium when the setup mode is selected, or a group of setup items that relate to the print mode initially if the still camera is loaded with the recording medium when the setup mode is selected.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIGS. 5A and 5B show two kinds of menu screens that are alternatively displayed on an LCD panel in a setup mode;

FIG. 11 is timing charts illustrating driving operations of the anodes for different exposure amounts.

DETAILED DESCRIPTION OF THE EMBODIMENTS

Figure 1:
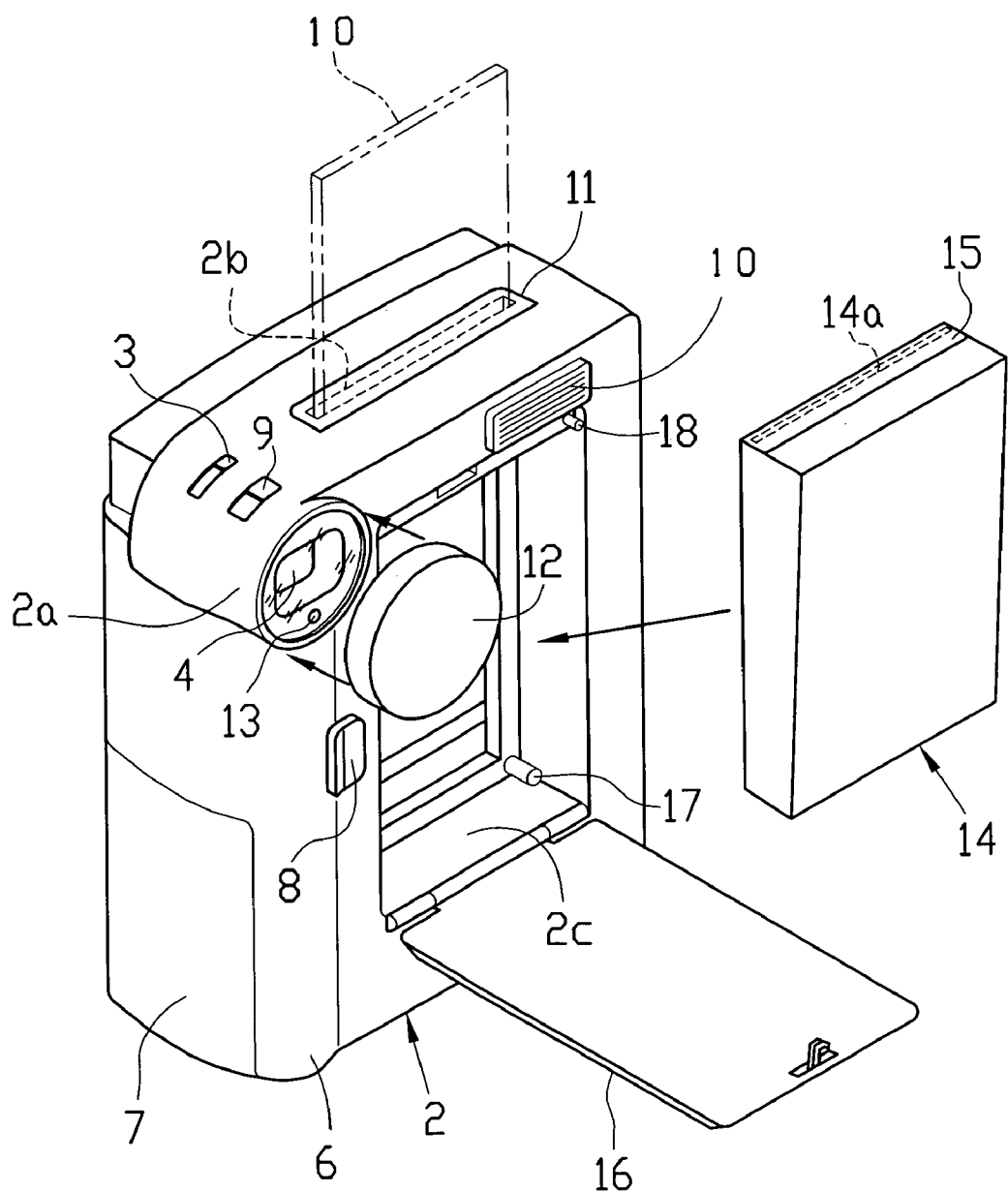
FIG. 1 is a front perspective view of a printer-incorporated electronic still camera according to an embodiment of the present invention, with its pack loading door open.
Figure 2:
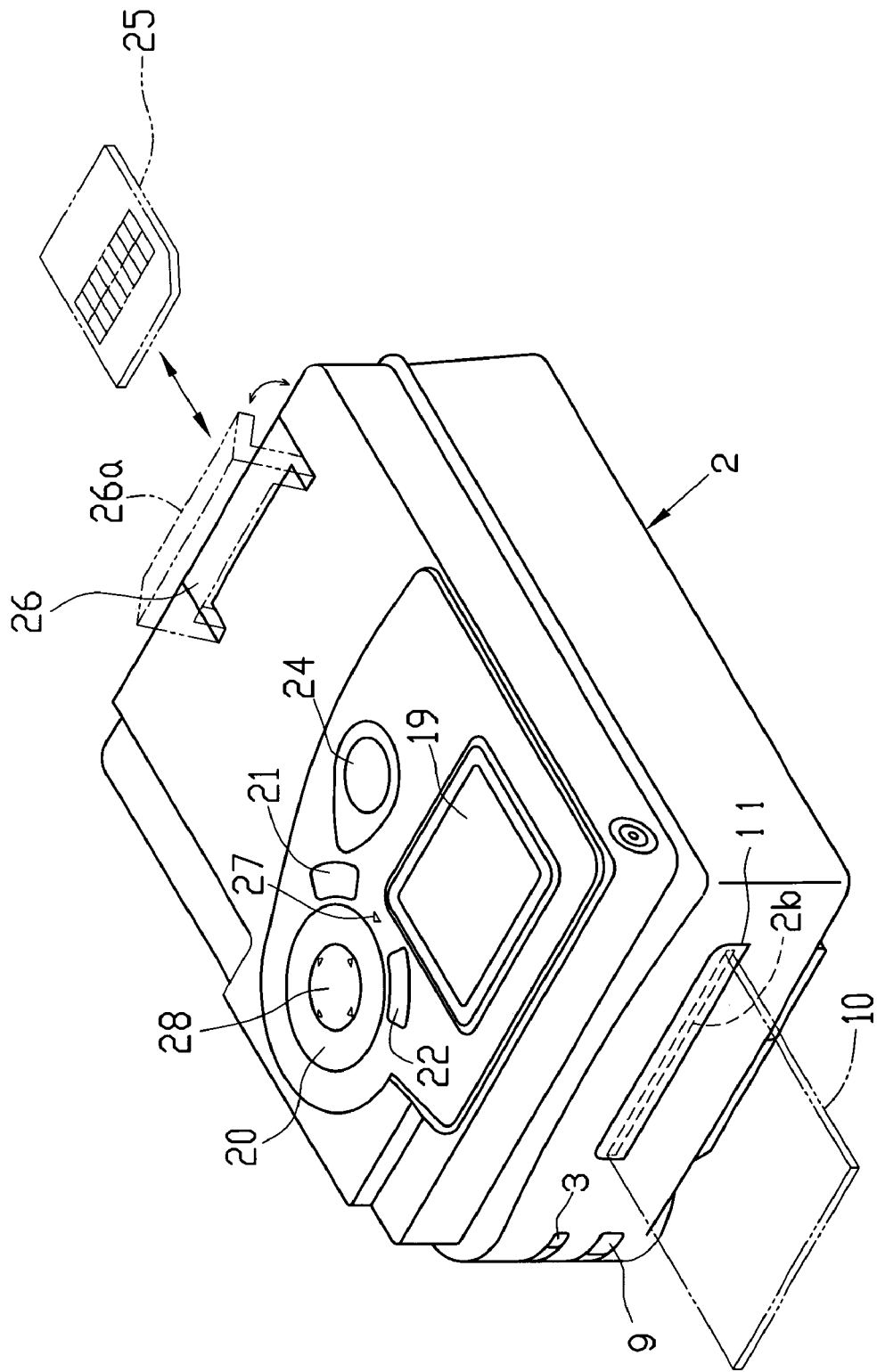
FIG. 2 is a rear perspective view of the printer-incorporated electronic still camera of FIG. 1, in a laid-down posture.

FIGS. 1 and 2 show an embodiment of a printer-incorporated electronic still camera, hereinafter called the still camera, wherein a power switch 3 and a close-up switch 9 are located on a top side of a camera body 2, and a camera lens 4 and a flash window 5 are located on an upper front portion of the camera body 2. A grip portion 6 contains a battery chamber therein, so a lid 7 is provided on the grip portion 6 to load or unload power source batteries, e.g. four AA type batteries connected in serial, by opening the lid 7. A release button 8 is located at a front position of the grip portion 6. The camera lens 4 is a pan-focus lens that includes a subject distance range from 1.2 m to an infinity in its depth of field, so it is fundamentally unnecessary to adjust focus of the camera lens 4. The close-up switch 9 is provided for permitting close-up photography in a range of several ten centimeters. It is alternatively possible to provide the still camera with a well-known automatic focusing device that uses trigonometry or a spatial frequency peak detection method. In that case, the camera lens 4 is focused on a subject distance upon the release button 8 being pressed halfway so far as the subject distance is in a standard range excluding the close-up range.

A lens cap 12 for covering the front of the camera lens 4 to protect it is attached to a front rim of a lens barrel portion 2a for the camera lens 4 in a removable fashion. A lens cap sensor 13 is provided below the camera lens 4 for detecting if the lens cap 12 is attached or not. Instead of the lens cap 12, a lens barrier may be mounted inside the lens barrel portion 2a, that slides in front of the camera lens 4 to open or close the camera lens 4.

A film ejection slot 2b is formed through a top face of the camera body 2, through which an exposed instant film sheet 10 is ejected. The film ejection slot 2b is usually closed by a light-shielding door 11. The light-shielding door 11 is pushed open by the ejected instant film sheet 10. A pack loading door 16 is hinged to a front portion of the camera body 2. By opening the pack loading door 16, as shown in FIG. 1, a film pack 14 may be loaded in a pack loading chamber 2c.

Figure 3:
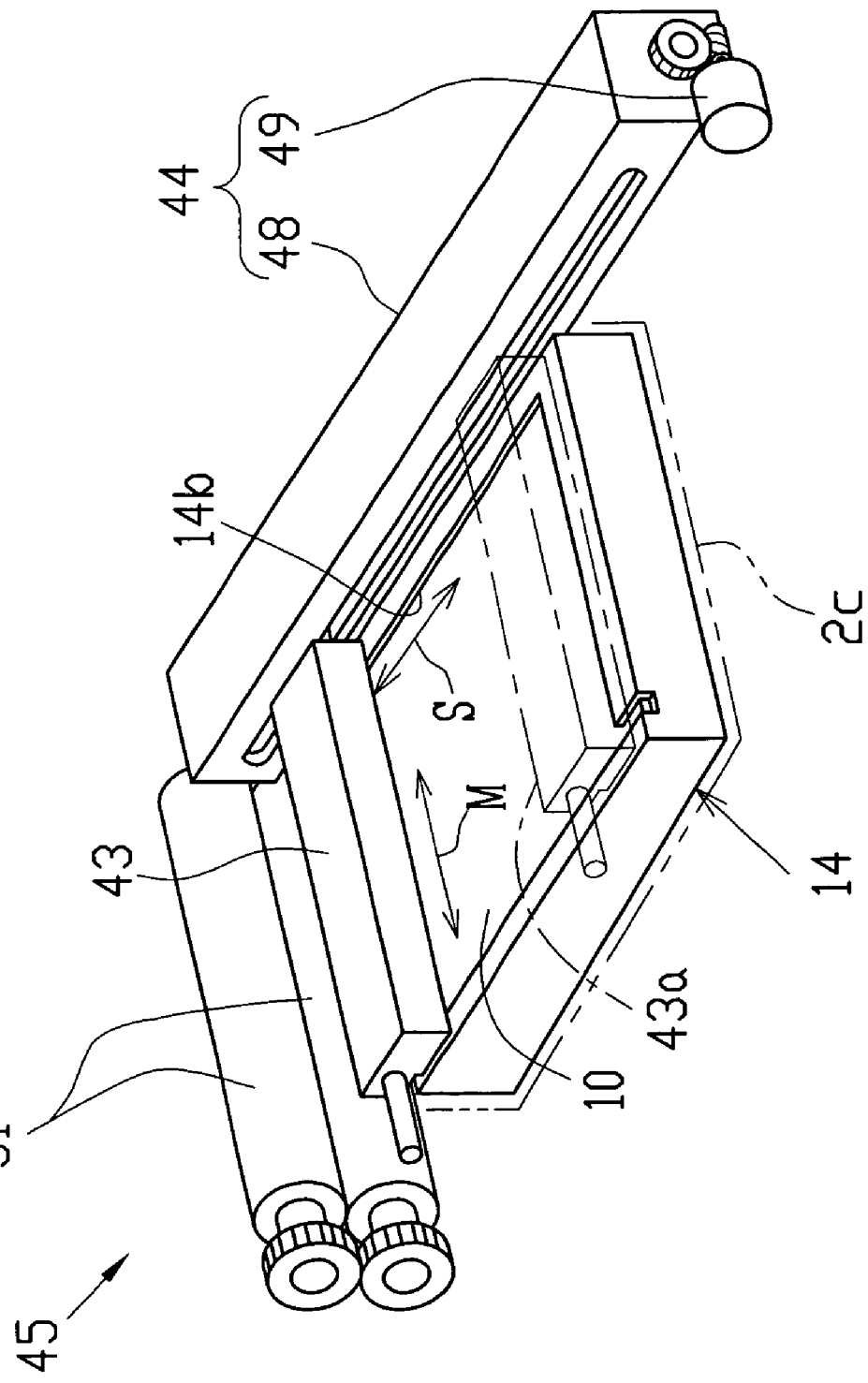
FIG. 3 is a schematic perspective view of an optical printer unit of the printer-incorporated electronic still camera.

The film pack 14 contains a predetermined number of, e.g. 10 sheets of, instant film sheets 10 in a stack. A slot 14a for letting the instant film sheets 10 one by one out of the film pack 14 is formed through a top face of the film pack 14. As shown in FIG. 3, an exposure opening 14b is formed through a front face of the film pack 14, that is oriented to the rear of the camera body 2 in the loaded position. The instant film sheet 10 is a well-known mono-sheet type. The mono-sheet type instant film sheet 10 is mainly constituted of a photosensitive layer, an image receiving layer, and a processing fluid pod. Before the film pack 14 is loaded in the still camera, the slot 14a is covered with a light-shielding cover 15 made of a resin film, whereas the exposure opening 14b is closed by a light-shielding sheet that is substantially equal in size of the instant film sheet 10 and is laid on an uppermost one of the stacked instant film sheets 10. When the release button 8 is pressed initially after the film pack 14 is newly loaded, the light-shielding sheet is ejected out of the film pack 14 through the slot 14a while pushing open the light-shielding cover 15, and then ejected out of the camera body 2 through the film ejection slot 2a. Then the photosensitive layer of the uppermost instant film sheet 10 is exposed through the exposure opening 14b.

A pack detection switch 17 is provided in the pack loading chamber 2c. The pack detection switch 17 is turned on when it is pressed by the film pack 14 as it is loaded in the pack loading chamber 2c. The pack detection switch 17 is turned off when the film pack 14 is unloaded. A door detection switch 18 is provided above the pack loading chamber 2c. The door detection switch 18 is turned on when it is pressed by the pack loading door 16 in its closed position, and is turned off when the pack loading door 16 is opened. Accordingly, it is possible to determine based on the switching conditions of these switches 17 and 18 when the film pack 14 is loaded or unloaded.

On the back side of the camera body 2, as shown in FIG. 2, an LCD panel 19, a mode selection dial 20, an execution key 21, a cancel key 22, and a print key 24 are provided. The LCD panel 19 constitutes an electronic viewfinder that displays moving images of subjects exist in a photographic field of the camera lens 3 in a real time fashion. For example, the LCD panel 19 is constituted of liquid crystal dot segments, micro color filters arranged in combination with the liquid crystal dot segments, and a fluorescent lamp for illuminating the liquid crystal dot segments with white light. A door member 26 is hinged to a bottom portion of the camera body 2. By opening the door member 26, as shown by phantom lines 26a in FIG. 2, a not-shown memory slot is exposed, for accepting an external memory 25, e.g. a Smart Media (a trade name), therein.

Figure 4:
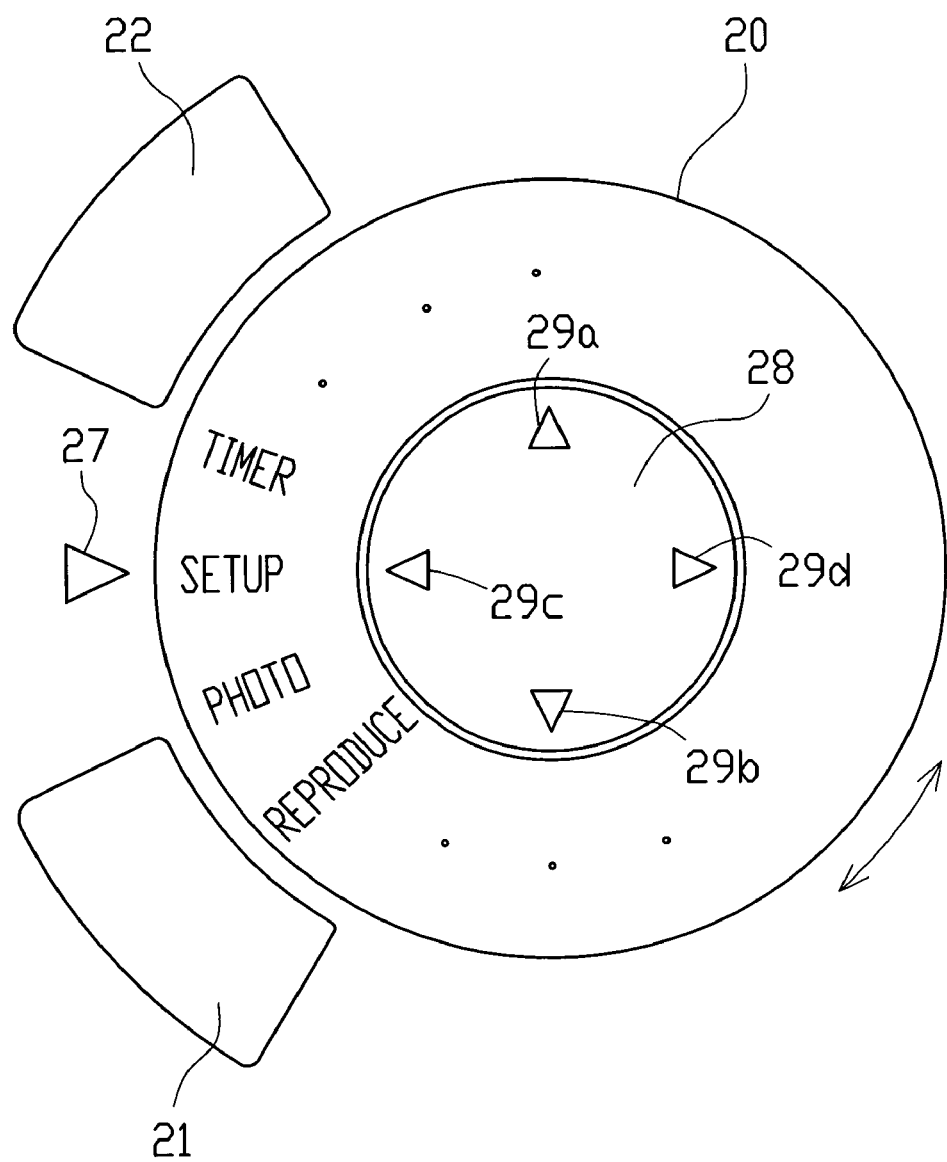
FIG. 4 is an enlarged top plan view illustrating a mode selection dial and other operation keys on the printer-incorporated electronic still camera.

As shown in FIG. 4, names of available modes, including "TIMER", "SETUP", "PHOTO" and "REPRODUCE" are provided on the mode selection dial 20. It is possible to use icons instead of these names, for indicating the respective modes. By rotating the mode selection dial 20 to position one of these names at an index 27 that is provided at a peripheral position of the mode selection dial 20, the modes are switched over. A round cursor key 28 is provided in a center of the mode selection dial 20. The cursor key 28 is provided with four direction marks 29a, 29b, 29c and 29d, which are arranged at constant intervals around its circumference. By pressing one of the four direction marks 29a to 29d, a cursor on the LCD display 19 is moved in the corresponding direction.

When the photography mode is selected, the LCD panel 19 displays moving images of subjects in the photographic field of the camera lens 4 in a real time fashion. When the release button 8 is pressed in the photography mode, image data of an image displayed at that moment on the LCD panel 19 is stored in the external memory 25, as set forth in detail later. When the reproduction mode is selected, the LCD panel 19 displays a still image based on stored image data. When the print key 24 is pressed in the reproduction mode, an image displayed on the LCD panel 19 starts being printed.

FIGS. 5A and 5B show two kinds of setup menus, tiled as a camera menu and a printer menu, that are alternatively displayed on the LCD panel 19 when the setup mode is selected. According to the present embodiment, one of the setup menus is automatically selected immediately after the still camera is set to the setup mode, depending upon whether the camera body 2 is in an unstable position, e.g.

gripped by hands, or it is in a stable position, e.g. on a table. For discriminating between these two positions of the camera body 2, an acceleration sensor 55 (see FIG. 7) is provided in the camera body 2. For example, when the still camera is set to the setup mode while the camera body 2 is held by hands, the camera menu shown in FIG. 5A is displayed in the initial condition on the LCD panel 19.

Each menu screen has a tab 31 or 32 on which the title of the menu "CAMERA MENU" or "PRINT MENU" is displayed. FIG. 5A shows an initial display condition of the camera menu where a cursor 33 is located on the tab 31, whereas FIG. 5B shows an initial display condition of the print menu where the cursor is located on the tab 32. The cursor 33 has a different color from those of a background and characters of the screen, so the cursor 33 apparently shows the selected menu or setup items. It is possible to display characters of the selected menu or item in a complementary color to the color of the cursor 33, or as a blank image while the cursor 33 is on the characters.

By pressing the direction mark 29c or 29d of the cursor key 28 in the initial display condition of the camera menu or the print menu, the cursor 33 is shifted left and right between the tabs 31 and 32, to switch over the screen between the camera menu and the print menu. Also by pressing the execution key 21 while the cursor 33 is on the tab 31 or 32, the cursor 33 is shifted left and right between the tabs 31 and 32 to choose between the camera menu and the print menu.

The camera menu shows a list of setup items, including "QUALITY", "PIXEL", "SHARPNESS", "BRIGHTNESS", "FRAME NO. DISPLAY" and "DATE DISPLAY". The item "QUALITY" is for choosing between two kinds of image quality: "FINE" and "NORMAL", wherein the image quality is defined by data compression rate of the image data to be stored. The item "PIXEL" represents the number of pixels constituting one picture frame at the photography, and there are two choices "1280" and "640" which represent 1280×1024 pixels and 640×480 pixels respectively. The item "SHARPNESS" is for choosing the degree of contrast between "LARGE" and "SMALL". The item "BRIGHTNESS" is for choosing the degree of brightness of the photographed image between "LIGHT" and "DARK". The item "FRAME NO. DISPLAY" is for designating whether to display a serial number of a photographed picture frame on the LCD panel 19 at each photography by choosing "YES" or "NO". The item "DATE DISPLAY" is for designating whether to display a date on the LCD panel 19 in the photography mode.

The print menu shows a list of setup items, including "PRINT NUMBER", "MONTAGE", "SHARPNESS", "BRIGHTNESS", "COLOR BALANCE" and "DATE PRINT". The item "PRINT NUMBER" is for designating the number of prints to make from a picture frame. The default print number "1" is displayed in the initial condition. The item "MONTAGE" is for choosing whether a photographed image is to be synthesized with another image for printing. The item "SHARPNESS" is for choosing the degree of contrast of the print image between "LARGE" and "SMALL". The item "BRIGHTNESS" is for choosing the degree of brightness of the print image between "LIGHT" and "DARK". The item "COLOR BALANCE" is for shifting the color balance toward red or green. The item "DATE PRINT" is for choosing whether a date is to be merged in the print image. Setup conditions of the respective items are determined when the setup mode is shifted to another mode by rotating the mode selection dial 20.

By pressing the direction mark 29a or 29b of the cursor key 28 while the camera menu or the print menu is displayed, the cursor 33 moves up and down between the respective setup items. Although all of the above described options of the respective items are shown in FIGS. 5A and 5B, it is preferable to display only one of the paired two options on the screen, in terms of space efficiency. In that case, one of the two options is alternately displayed upon the execution key 21 being pressed while the cursor 33 is located on that item. Take the item "QUALITY" for instance, when the execution key 21 is pressed while the cursor 33 is located on the item "QUALITY" and the option "FINE" is displayed, the option "FINE" is replaced by the optical "NORMAL". By pressing the execution key 21 again in this condition, the option "FINE" is displayed again in place of the option "NORMAL". By shifting the cursor 33 to the next item, the displayed option is chosen. Other items are set up in the same way, except the item "PRINT NUMBER". The print number increments or decrements by pressing the direction mark 29a or the direction mark 29b respectively while putting the cursor 33 on the item "PRINT NUMBER". Needless to say, the print number would not become less than "1".

However, the way of setting up the respective items by use of the cursor key 29 and the execution key 21 is not limited to the above embodiment, but may be modified appropriately. For example, it is possible to choose between the two options of each item by pressing the direction mark 29c or 29d while locating the cursor 33 on that item, and shift the cursor to the next item by pressing the execution key 21.

FIG. 3 shows an optical printer unit of the still camera, that is located on the back side of the pack loading chamber 2c. The optical printer section is constituted of a printing head 43, a head scanning mechanism 44, and a film advancing mechanism 45 including a pair of spread rollers 51 that are disposed behind the film ejection slot 2b. The printing head 43 extends in a main scan direction M, that is perpendicular to a film advancing direction from the film pack 14 to the spread rollers 51. The printing head 43 is moved by the head scanning mechanism 44 in a sub scan direction S that is parallel to the film advancing direction. The printing head 43 projects printing light beams onto the uppermost instant film sheet 10 across the width of the exposure opening 14b, as it moves in the sub scan direction S.

The head scanning mechanism 44 is constituted of a head conveying mechanism 48, and a scanning motor 49 for driving the head conveying mechanism 48. For example, the head conveying mechanism 48 consists of pulleys and a conveyer belt. The film advancing mechanism 45 is constituted of the spread rollers 51, a not-shown advancing claw, and a not-shown driving device for driving these elements. The film advancing mechanism 45 may be configured in the same way as those used in conventional instant cameras, such as disclosed in JPA 4-194832. The film advancing mechanism 45 is activated when an image is completely printed by the printing head 43, to advance the exposed instant film sheet 10 out of the film pack 14 through the spread rollers 51. While the instant film sheet 10 is being squeezed through the spread rollers 51, the pod is ruptured and the processing fluid is spread between the photosensitive layer and the image receiving layer. Thereby, a latent image formed on the photosensitive layer is transferred to the image receiving layer and developed into a positive image in a few minutes after the ejection.

Figure 6:
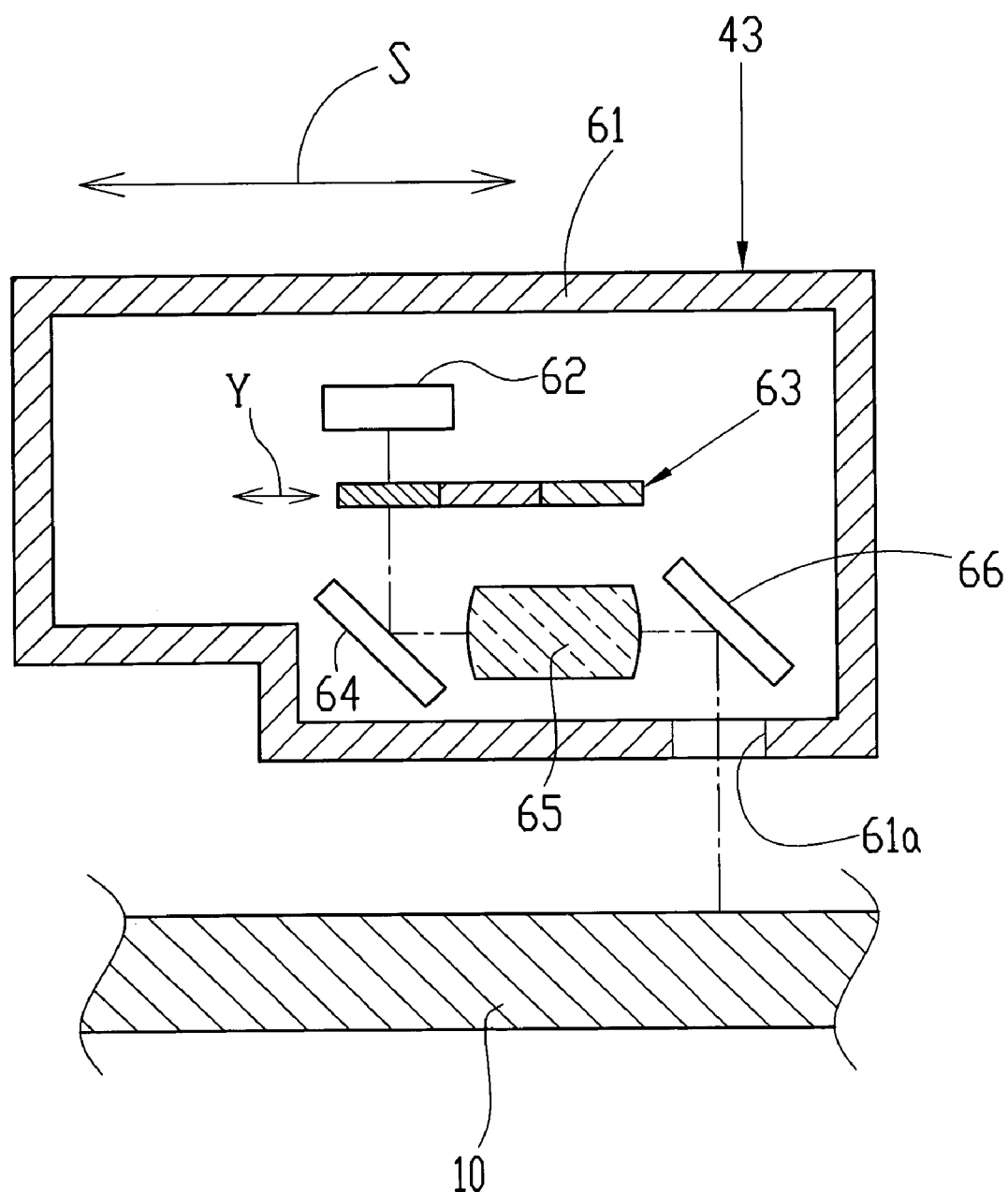
FIG. 6 is an explanatory diagram illustrating a section of a printing head of the optical printer unit.

FIG. 6 shows an example of the printing head 43. In a light-tight housing 61 is mounted a fluorescent display panel 62 that is elongated in the lengthwise direction of the printing head 43, i.e. the main scan direction M. The fluorescent display panel 62 emits white light that includes light components of red, green and blue. A color filter 63 is placed in a path of white light from the fluorescent display panel 62. The color filter 63 consists of a red pass filter portion, a green pass filter portion and a blue pass filter portion. The respective filter portions extend along the fluorescent display panel 62 and are displaced from each other in a perpendicular direction Y to the fluorescent display panel 62. Since the printing head 43 and thus the fluorescent display panel 62 extend in the main scan direction M, the direction Y corresponds to the sub scan direction S. By shifting the color filter 63 in the direction Y in response to a filter switching signal, these filter portions are seriatim positioned in the white light path. Thus, one of the three color components that passes through the color filter 63 is directed through a mirror 64, a micro lens array 65 and a mirror 66 to an opening 61a of the housing 61, and then projected as printing light of one color onto the instant film sheet 10. The micro lens array 65 consists of an array of micro cylindrical lenses, called SELFOC lens (a trade name), that prevents the printing light beans from diverging to other pixel areas.

In this embodiment, the optical printer unit prints a full-color image in a three-color frame sequential fashion while the printing head 43 makes three laps between a print start position where the opening 61a is opposed to a bottom end of the exposure opening 14b, as shown by phantom line in FIG. 3, to a print end position where the opening 61a is opposed to a top end of the exposure opening 14b, as shown by solid line in FIG. 3.

Figure 7:
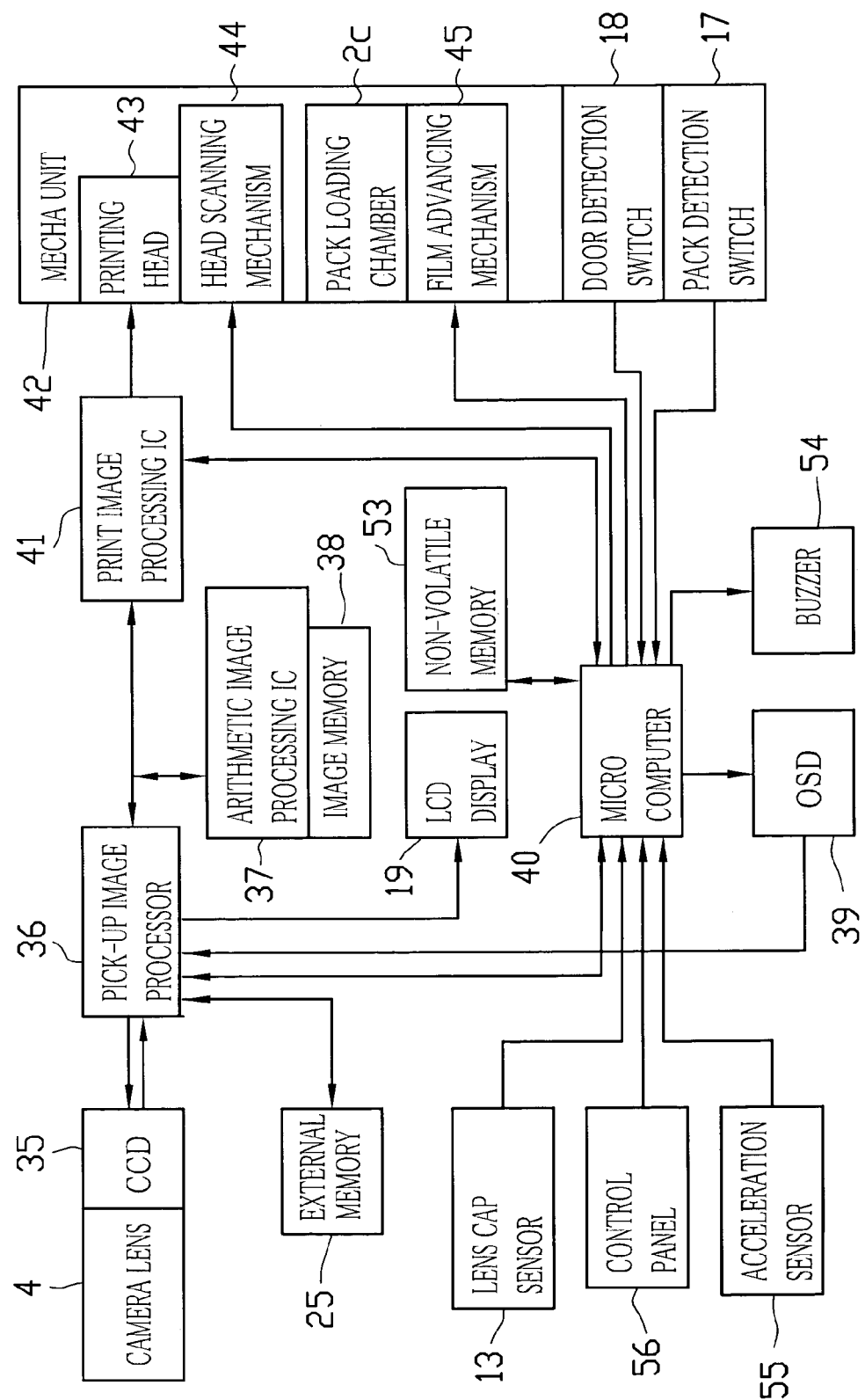
FIG. 7 is a block diagram illustrating the circuitry of the printer-incorporated electronic still camera.

FIG. 7 shows an electric structure of the still camera. In FIG. 7, a mechanism unit 42 is constituted of the pack loading chamber 2c, the pack detection switch 17, the door detection switch 18, the printing head 43, the head scanning mechanism 44 and the film advancing mechanism 45. The camera lens 4 includes a photographic optical system, a shutter mechanism and a stop mechanism. A CCD image sensor 35 is placed behind the camera lens 4, so an optical image of a subject is formed on a photo-electric conversion surface of the CCD image sensor 35. The CCD image sensor 35 converts the optical image into electric image signals of three colors, and outputs them to a pick-up image processor 36.

The pick-up image processor 36 is constituted of a plurality of ICs, and carries out many kinds of operations under the control of an arithmetic image processing IC 37. For instance, the pick-up image processor 36 controls the stop aperture size and the shutter speed of the camera lens 4, controls the CCD image sensor 35 for picking up three color (RGB) image signals of one frame, and converts the RGB image signals into a digital YCrCb signal that is composed of a luminance signal and a color-difference signal, for storing it in an image memory 38. The pick-up image processor 36 also reads out the YCrCb signal from the image memory 38 and converts it into an NTSC picture signal and sends it to the LCD panel 19, adds character signals from an on-screen display IC (OSD) 39 to the picture signal, communicates with a microcomputer 40 by means of serial signals, and interfaces the external memory 25 with the arithmetic image processing IC 37 such that image data stored as the YCrCb signal in the image memory 38 may be written on the external memory 25 after the image data is compressed in the arithmetic image processing IC 37, and that compressed image data may be read out from the external memory 25 and sent to the arithmetic image processing IC 37.

The arithmetic image processing IC 37 controls the pick-up image processor 36 for reading out image data from the image memory 39 and writing image data in the image memory 39. The arithmetic image processing IC 37 also converts image data from the YCrCb format into another format that is suitable for the external memory 25, or restoring it to the YCrCb format, and coverts image data of the YCrCb format into print data that is suitable for a print image processing IC 41. The print image processing IC 41 receives print data from the arithmetic image processing IC 37 in a line sequential fashion. The print image processing IC 41 includes a line memory for storing the print data line by line, and outputs drive data to the printing head 43 based on the print data of one line in a manner as set forth later.

The image memory 38 is an IC memory that stores image data in the YCrCb format. The image memory 38 may be included in the arithmetic image processing IC 37. A non-volatile memory 53, e.g. EEPROM, stores many kinds of control sequences which are referred to by the microcomputer 40. The lens cap sensor 13 for checking if the lens cap 12 is attached to the front of the camera lens 4 is connected to the microcomputer 40. An alarming buzzer 54 is controlled by the microcomputer 40. The acceleration sensor 55 is connected to the microcomputer 40, for detecting whether the still camera is carried about or set in the stable position. A control panel 56 is a man-machine interface panel that connects the microcomputer 40 to the release button 8, the mode selection dial 20, the execution key 21, the cancel key 22, the print key 24 and other operation members.

Figure 8:
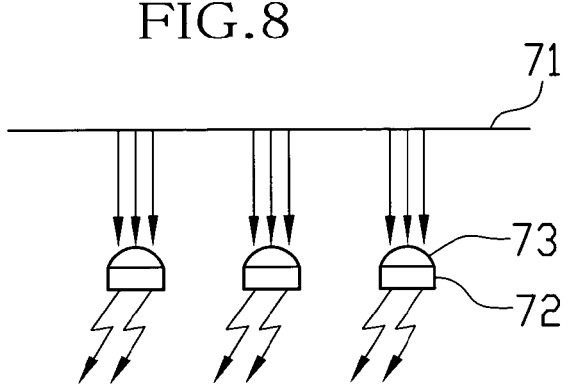
FIG. 8 is an explanatory diagram illustrating essential elements of a fluorescent display panel of the printing head.

As shown in FIG. 8, the fluorescent display panel 62 has a filament 71, and anodes 72 are placed underneath the filament 71. Fluorescent objects 73 are put on one side of each anode 72 that faces the filament 71. A constant AC voltage is applied across the filament 71. When a sufficiently high DC voltage is applied to the anodes 72, as compared to the voltage across the filament 71, the filament 71 radiates thermions toward the anodes 72. The thermions clash against the fluorescent objects 73, so the fluorescent object 73 is excited to emit light beams. The light beams are projected toward the color filter 63. It is to be noted that the fluorescent display panel 62 has a glass casing whose inside is maintained substantially vacuum, in which the filament 71, the anodes 72 and other elements are contained.

Figure 9:
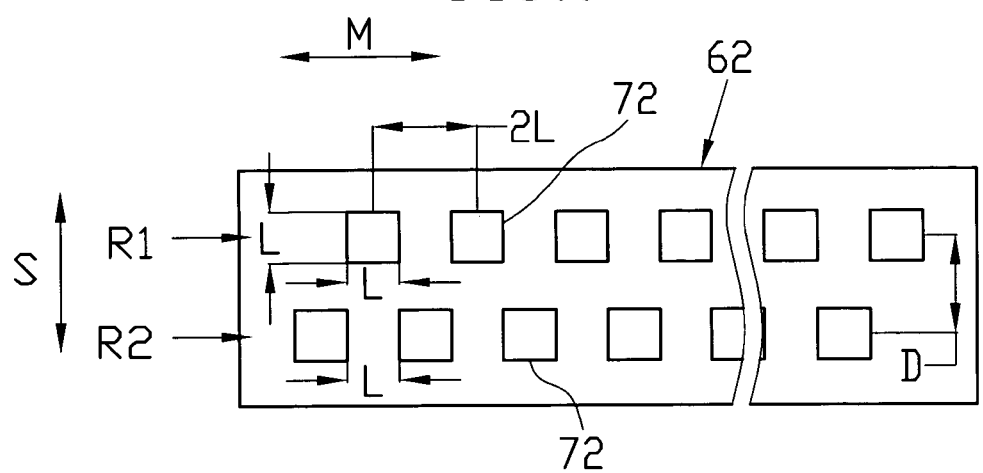
FIG. 9 is an explanatory diagram illustrating an arrangement of anodes of the fluorescent display panel.

FIG. 9 shows the anodes 72 as viewed from an opposite side to the filament 71. Each anode 72 has a square shape, and corresponds to one pixel on printing. The anodes 72 are arranged in two rows R1 and R2 along the main scan direction M, and at constant intervals in each row. Provided that one side of the anode 72 has a length L, the interval is "2L (=2×L)". The anodes 72 of the first row R1 are staggered from those of the second row R2 by the length L, whereas a center of the second row R2 is spaced from a center of the first row R1 by a distance D in the sub scan direction S. The distance D is determined such that the printing head 43 is moved by an amount of L/2 in the sub scan direction S, each time half of dots of one line are recorded on the instant film sheet 10, so that even dots of one line which are recorded by light beams from the anodes 72 of the first row R1, are aligned with odd dots of the same line which are recorded by light beams from the anodes 72 of the second row R2.

Figure 10:
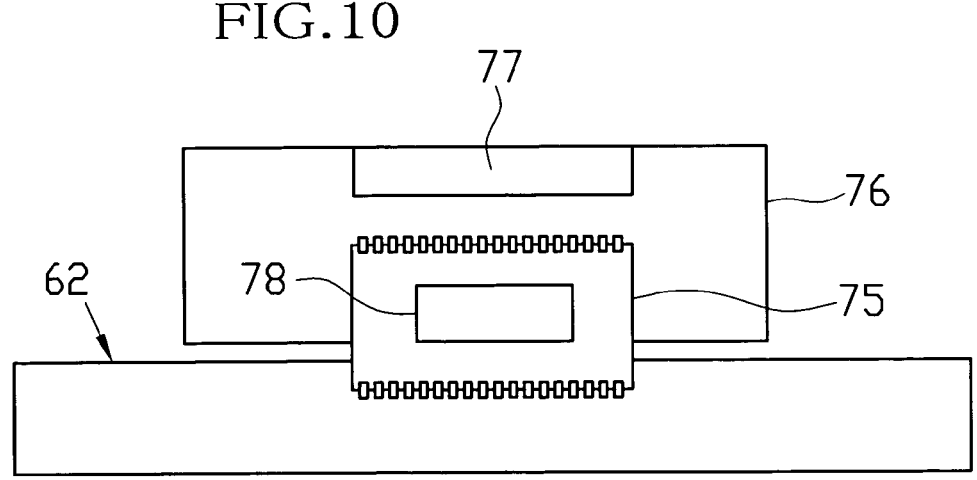
FIG. 10 is an explanatory diagram illustrating a flexible substrate and a printing head substrate of the printing head.

As shown in FIG. 10, the fluorescent display panel 62 is connected to a printing head substrate 76 through a flexible substrate 75. The printing head substrate 76 is connected to the print image processing IC 41 through a connector 77. A driver IC 78 is mounted on the flexible substrate 75 so that the print data and a printing head control signal from the print image processing IC 41 are entered through the connector 77, the printing head substrate 76 and the flexible substrate 77 into the driver IC 78. The driver IC 78 controls the anodes 72 individually in accordance with the print data, such that quantities of the light beams emitted from the individual anodes 72 vary depending upon densities of the corresponding pixels.

Now the operation of the still camera configured as above will be described.

When the power switch 3 is turned on, a power signal from the power switch 3 is entered through the control panel 56 into the microcomputer 40, then the microcomputer 40 sets the still camera in a mode that is determined according to the rotational position of the mode selection dial 20.

When the power switch 3 is turned on while the indicia "SETUP" on the mode selection dial 20 is mated with the index 27, the still camera is set to the setup mode. If the camera body 2 is held by hands at that time, that is, in the unstable position, the acceleration sensor 55 detects the instability of the camera body 2, so the microcomputer 40 controls the LCD panel 19 to display the camera menu, as shown in FIG. 5A. If the setup mode is selected while the camera body 2 is put on a desk or the like, the acceleration sensor 55 detects the stability of the camera body 2, so the microcomputer 40 controls the LCD panel 19 to display the print menu, as shown in FIG. 5B.

To have the other setup menu displayed, the user presses the direction mark 29c or 29d of the cursor key 28 or the execution key 21 to shift the cursor 33 to the other tab 31 or 32. When the desired setup menu is displayed, the user sets up the appropriate item by operating the cursor key 28 and the execution key 21 in the manner as described above. By pressing the cancel key 22, the setup conditions are reset to the previous ones. When the setup mode is switched to another mode by rotating the mode selection dial 20, the latest setup conditions are determined and entered to the microcomputer 40.

When the setup mode is selected again by rotating the mode selection dial 20, the camera menu or the print menu is initially displayed depending upon the position of the camera body 2 as detected by the acceleration sensor 55.

Because a large number of setup items are sorted into a plurality of groups, and are displayed group by group, operation efficiency in the setup mode is remarkably improved. Furthermore, each item is displayed in a sufficiently large size even where the LCD panel 19 is small. Since either the camera menu or the print menu is automatically selected depending upon whether the camera body 2 is in the unstable position or in the stable position when the setup mode is selected, operation efficiency is still more improved.

When the indicia "PHOTO" on the mode selection dial 20 is mated with the index 27, the still camera is set to the photography mode. In the photography mode, RGB image signals from the CCD image sensor 35 is converted into image data and thereafter into the NTSC picture signal through the pick-up image processor 36. The NTSC signal is sent to the LCD panel 19, so the LCD panel 19 displays images of subjects in a real time fashion.

When the release button 8 is operated in the photography mode, a release signal is sent to the microcomputer 40, so the microcomputer 40 outputs a photography command to the arithmetic image processing IC 37 through the pick-up image processor 36. Then the arithmetic image processing IC 37 controls the pick-up image processor 36 to drive the shutter mechanism in the camera lens 4, for blocking light from the CCD image sensor 35, so that the CCD image sensor 35 accumulates electric charges in accordance with an optical image to be photographed. Next, the pick-up image processor 36 picks RGB image signals from the CCD image sensor 35, and converts them into the YCrCb signals, and sends them to the arithmetic image processing IC 37.

The arithmetic image processing IC 37 writes the YCrCb signals as image data in the image memory 38. After the image data of one frame is written on the image memory 38, the arithmetic image processing IC 37 converts the image data of one frame into a compressed format that is adapted to the external memory 25, and sends it to the pick-up image processor 36. Then, the pick-up image processor 36 writes the compressed image data on the external memory 25.

When the reproduction mode is selected by operating the mode selection dial 20, a reproduction command is entered through the control panel 56 into the microcomputer 40. The microcomputer 40 sends the reproduction command to the arithmetic image processing IC 37 via the pick-up image processor 36. Then the arithmetic image processing IC 37 controls the pick-up image processor 36 to read out the image data from the external memory 25 through the pick-up image processor 36. By operating the cursor key 28, an appropriate picture frame is designated to be reproduced. Then, image data of the designated frame is read out from the external memory 25, and is reconverted into the YCrCb signals in the arithmetic image processing IC 37, and the YCrCb signals are written on the image memory 38. After the image data of one frame is written as the YCrCb signal on the image memory 38, the pick-up image processor 36 reads out the image data from the image memory 38 and, at the same time, converts it into NTSC signals and sends them to the LCD panel 19. As a result, the LCD panel 19 displays a still image reproduced from with the NTSC signal.

When the print key 24 is operated in the reproduction mode, a print command is entered in the microcomputer 40. Then, the microcomputer 40 starts a printing process for making a hard of an image presently displayed on the LCD panel 19, by outputting the print command to the pick-up image processor 36 and the print image processing IC 41. Then the pick-up image processor 36 outputs the print command to the arithmetic image processing IC 37, so the arithmetic image processing IC 37 converts the image data stored in the image memory 38, that is the image data of the presently displayed image on the LCD display 19, into print data whose format is adapted to the printing head 43, and rewrite the image memory 38 with the print data. After the print data of one frame is written on the image memory 38, the arithmetic image processing IC 37 transfers the print data line after line to the print image processing IC 41, so the print image processing IC 41 sequentially stores the print data of one line in its line memory.

In this instance, a full-color image is recorded in a three color frame sequential fashion in the order from red, green and blue. Upon the print command, the red pass filter portion of the color filter 63 is first inserted in the light path of the fluorescent display panel 62, and the print image processing IC 41 first produces drive data for red pixels of a first line from the print data of the first line. Provided that the pixels should have 256 gradations, the drive data for each pixel is constituted of a number of drive pulses, the number varying in a range from 0 to 256 depending upon the tonal grade of that pixel.

More specifically, because the instant film sheet 10 develops a color at an exposed portion depending upon the color of printing light, and unexposed portions remains black, the tonal grade "0" corresponds to black, whereas the tonal grade "256" corresponds to white, if the printing light is white. Therefore, as shown in FIG. 11, the print image processing IC 41 modifies width of a drive signal for each pixel depending upon the print data of that pixel, and outputs the drive pulses to the printing head 43 based on the drive signal in synchronism with a printing clock signal.

As described above, since the anodes 72 of the first row R1 and those of the second row R2 should be driven alternately, the print image processing IC 41 produces the drive data for red of even pixels of the first line from the print data, and outputs the drive data as different numbers of drive pulses to the individual anodes 72 of the first row R1 at the timing of the printing clock signal. Thus, every second red dots of the first line are recorded as latent images with different densities. Thereafter, the printing head 43 is moved by the predetermined amount in the sub scan direction, and the print image processing IC 41 produces the drive data for red of odd pixels of the first line from the print data. Then, the print image processing IC 41 outputs the drive data as different numbers of drive pulses to the individual anodes 72 of the second row R2 at the timing of the printing clock signal, so other half of red dots of the first line are recorded as latent images between the previously recorded red dots.

While the anodes 72 of the second row R2 emit light beams to record the odd dots of the first line, the arithmetic image processing IC 37 transfers print data of a second line to the print image processing IC 41, so the print image processing IC 41 produces the drive data for red of even pixels of the second line from the print data. When all the red dots of the first line are recorded, the printing head 43 is moved by the predetermined amount in the sub scan direction. Then the print image processing IC 41 outputs the drive data for red of even pixels of the second line as different numbers of drive pulses to the individual anodes 72 of the first row R1 at the timing of the printing clock signal. Thereafter, the printing head 43 is moved by the predetermined amount in the sub scan direction. Then the print image processing IC 41 produces the drive data for red of odd pixels of the second line from the print data, and outputs the drive data as different numbers of drive pulses to the individual anodes 72 of the second row R2 at the timing of the printing clock signal. In this way, even red dots and odd red dots of each line are alternately recorded as latent images on the instant film sheet 10, as the printing head 43 is moved in the sub scan direction S.

When the printing head 43 reaches the print end position and thus a predetermined number of lines of red dots are recorded, the printing head 43 is moved back to the print start position 43a. Then, the green-pass filter portion of the color filter 63 is inserted into the light path from the fluorescent display panel 62 under the control of the microcomputer 40. Thereafter, green dots are recorded as latent images in accordance with drive data for green in the same way as for the red dots. After the green dots are entirely recorded, the printing head 43 is moved back again from the print end position to the print start position 43a, to record blue dots in the same way as for the red and green dots.

When the three color dots are entirely recorded on the instant film sheet 10, the microcomputer 40 drives the film advancing mechanism 45 to eject the instant film sheet 10 through the spread rollers 51 out of the camera body 2, in the same way as in a conventional instant camera. While the instant film sheet 10 is being squeezed through the spread rollers 51, the pod is ruptured and the processing fluid is spread between the photosensitive layer and the image receiving layer. Thereby, the latent image is developed into a positive image in a few minutes after the ejection.

To print another picture frame in succession, the frame to print is selected by operating the cursor key 28 in the reproduction mode, and the print key 24 is pressed while the frame to print is displayed on the LCD panel 19. Then, the displayed frame is printed in the same way as described above. If a plural number of hard copies of the same picture frame are to be made in succession, the printing process is automatically restarted based on the same image data. By pressing the cancel key 22 during the successive printing, the printing process is terminated after the last exposed instant film sheet 10 is ejected, and the still camera returns to the reproduction mode.

In the above embodiment, the setup menu displayed immediately after the setup mode is selected, is determined depending upon whether the camera body 2 is stable or not. According to another embodiment, the setup menu displayed immediately after the setup mode is selected, is determined depending upon whether the camera lens 4 is covered with the lens cap 12 or not. In this embodiment, if it is determined based on a detection signal from the lens cap sensor 13 that the lens cap 12 is attached to the front rim of the lens barrel portion 2a of the camera lens 4 when the setup mode is selected, the print menu is displayed on the LCD panel 19. If not, the camera menu is displayed immediately after the setup mode is selected.

It is also possible to choose between the camera menu and the print menu depending upon whether the film pack 14 is loaded or not. In that case, if it is determined based on the detection signal from the film pack sensor 17 that the film pack 14 is loaded when the setup mode is selected, the print menu is initially displayed. On the other hand, if the film pack 14 is not loaded when the setup menu is selected, the camera menu is displayed first. It is alternatively possible to check if the loaded film pack 14 contains any instant film sheets 10, and display the print menu first in the setup mode if there are not any instant film sheets in the loaded film pack 14. For this purpose, it is preferable to provide a film counter for counting the number of exposed instant film sheets.

It is of course possible to determine which setup menu is to be displayed first in the setup mode taking account of some of the above described conditions.

Instead of determining the initial display condition in the setup mode depending upon the condition of the still camera, the first displayed setup menu may be that displayed last in the preceding setup mode. On the contrary, it is possible to design that one setup menu is displayed first if the other setup menu was displayed last in the preceding setup mode. It is also possible to display the camera menu first if the voltage level of the power source batteries is below a lower limit necessary for carrying out the printing process.

Although the camera menu and the print menu are available as the setup menus in the above embodiment, it is possible to provide other setup menus in addition. The tabs 31 and 32 may be omitted. In that case, the setup menus are cyclically switched over in turn, for example, each time the execution key is pressed. It is also possible to display the respective setup menus at regular time intervals in a cyclic fashion, such that one of the setup menu is selected by pressing the execution key while that setup menu is on the display.

The configuration of the printer unit is not to be limited to the above embodiment but may be modified appropriately. Although the printer unit of the above embodiment is of an optical type, the present invention is applicable to a printer-incorporated electronic still camera that uses a thermosensitive type printer or another type printer.

Thus, the present invention is not to be limited to the above embodiments but, on the contrary, various modifications are possible to those skilled in the art without departing from the scope of appended claims.

What is claimed is:

1. A printer-incorporated electronic still camera comprising an imaging device, a memory, a printing device, a display device, and a mode selection device for switching over the still camera between a photography mode for converting optical images into electronic image signals through the imaging device and storing the image signals in the memory, a reproduction mode for displaying still images on the display device based on the image signals read out from the memory, a print mode for printing the displayed still image on a recording medium, and a setup mode for setting up many kinds of setup items of the still camera, wherein the setup items are sorted into a plurality of groups, and the display device displays the setup items of one group at a time in the setup mode, the printer-incorporated electronic still camera further comprising an acceleration sensor and a device for judging by signals from the acceleration sensor whether the still camera is in a stable position or in an unstable position, and controlling the display device to display a group of setup items that relate to the photography mode initially if the still camera is judged to be in the unstable position when the setup mode is selected, or a group of setup items that relate to the print mode initially if the still camera is judged to be in the stable position when the setup mode is selected.

2. A printer-incorporated electronic still camera comprising an imaging device, a memory, a printing device, a display device, and a mode selection device for switching over the still camera between a photography mode for converting optical images into electronic image signals through the imaging device and storing the image signals in the memory, a reproduction mode for displaying still images on the display device based on the image signals read out from the memory, a print mode for printing the displayed still image on a recording medium, and a setup mode for setting up many kinds of setup items of the still camera, wherein the setup items are sorted into a plurality of groups, and the display device displays the setup items of one group at a time in the setup mode, the printer-incorporated electronic still camera further comprising a lens shielding device for shielding a lens of the imaging device from external light, and a detection device for detecting whether or not the lens is shielded by the lens shielding device, and a control device for controlling the display device to display a group of setup items that relate to the photography mode initially if the lens is not shielded when the setup mode is selected, or a group of setup items that relate to the print mode initially if the lens is shielded when the setup mode is selected.

3. A method for using an electronic camera comprising an imaging device, a memory, a printing device, a display, and a mode selection device, the method comprising:

switching the electronic camera between one of a photography mode for converting optical images into electronic image signals through the imaging device and storing the electronic image signals in the memory, a reproduction mode for displaying the electronic image signals on the display, a print mode for printing the electronic image on a recording medium using the printing device, and a setup mode for setting up a plurality of setup items of the electronic camera, wherein the plurality of setup items are sorted into a plurality of groups, and the display device displays only one of the plurality of groups at a time in the setup mode;

judging a stability of a camera body of the electronic camera; and displaying one of the plurality of groups in accordance with the stability of the camera body when the setup mode is selected, wherein the plurality of groups comprises a print menu relating to the print mode and a camera menu relating to the photography mode and one of the print mode and the photography mode is displayed in accordance with the stability.

* * * * *